United States Patent
Wang et al.

(10) Patent No.: US 10,271,410 B1
(45) Date of Patent: Apr. 23, 2019

(54) METHOD, DEVICE AND COMPUTER PROGRAM PRODUCT FOR CONTROLLING LIGHTS

(71) Applicant: Industrial Technology Research Institute, Hsinchu (TW)

(72) Inventors: Yin-Jie Wang, Hsinchu (TW); Tzung-Te Chen, Taipei (TW); Han-Kuei Fu, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/974,673

(22) Filed: May 8, 2018

(30) Foreign Application Priority Data

Dec. 19, 2017 (TW) .............................. 106144652 A

(51) Int. Cl.
*H05B 37/02* (2006.01)

(52) U.S. Cl.
CPC ....... *H05B 37/029* (2013.01); *H05B 37/0218* (2013.01); *H05B 37/0272* (2013.01)

(58) Field of Classification Search
CPC .............. H05B 37/029; H05B 37/0272; H05B 37/0218
See application file for complete search history.

(56) References Cited

U.S. PATENT DOCUMENTS

| | | | |
|---|---|---|---|
| 8,796,948 | B2 | 8/2014 | Weaver et al. |
| 2010/0127638 | A1 | 5/2010 | Lan et al. |

FOREIGN PATENT DOCUMENTS

| | | |
|---|---|---|
| CN | 101258780 | 9/2008 |
| CN | 103237391 | 8/2013 |
| CN | 103687188 | 3/2014 |
| CN | 106102261 | 11/2016 |
| TW | 201242429 | 10/2012 |
| TW | 201542035 | 11/2015 |
| TW | I574583 | 3/2017 |
| TW | M541548 | 5/2017 |

OTHER PUBLICATIONS

"Office Action of Taiwan Counterpart Application", dated Dec. 5, 2018, p. 1-p. 7.

*Primary Examiner* — Joseph L Williams
(74) *Attorney, Agent, or Firm* — JCIPRNET

(57) ABSTRACT

A light controlling method, a light controlling device, and a computer program product are provided. The light controlling method includes: displaying a user controlling interface which includes a plurality of first input parameter fields; receiving a first input parameter input through the first input parameter fields; obtaining a light parameter set corresponding to the first input parameters from a human factor light parameter table; transmitting a wireless signal to control a light according to the light parameter set.

18 Claims, 7 Drawing Sheets

METHOD, DEVICE AND COMPUTER PROGRAM PRODUCT FOR CONTROLLING LIGHTS

CROSS-REFERENCE TO RELATED APPLICATION

This application claims the priority benefit of Taiwan application serial no. 106144652, filed on Dec. 19, 2017. The entirety of the above-mentioned patent application is hereby incorporated by reference herein and made a part of this specification.

BACKGROUND

1. Technical Field

The disclosure relates to a light regulating technique. More particularly, the disclosure relates to a light controlling method, a light controlling device, and a computer program product.

2. Description of Related Art

Smart home appliances have become a trend in development of science and technology. The concept of smart home appliances lies in not only providing people with a more convenient life but also bringing an ideal of a better life to reality.

In terms of lighting, for example, light is adjusted in consideration of surrounding space and users' needs rather than energy conservation. However, although the users may adjust the light in compliance with their needs through smart lighting, the users have to go through trials to satisfy said needs. Particularly, the adjustment of light is burdensome to the users if they are not familiar with the application of a light source to the environment. In addition, the needs of the users are often complicated. Therefore, people skilled in the art are devoted to a topic of how to provide a simple regulating method to allow the users to adjust light to match their needs.

SUMMARY

The disclosure provides a light controlling method as well as a corresponding light controlling device and a computer program product, thereby allowing a user to adjust light of a lamp through a simple regulating method. As such, the needs of the user can be satisfied.

A light controlling method provided in an embodiment of the disclosure includes displaying a user interface including a plurality of first input parameter fields in the user interface; receiving input of at least one first input parameter through the plurality of first input parameter fields; obtaining a light parameter set corresponding to the at least one first input parameter from a human factor light parameter table; transmitting a wireless signal to control a light emitted from a lamp according to the light parameter set.

A light controlling device provided in an embodiment of the disclosure includes a display unit, an input unit, a processing unit, and a signal transmission unit. The display unit displays a user interface. The user interface includes a plurality of first input parameter fields. The input unit receives at least one first input parameter through the plurality of first input parameter fields. The processing unit is coupled to the display unit and the input unit, and the processing unit obtains a light parameter set corresponding to the at least one first input parameter from a human factor light parameter table. The signal transmission unit is coupled to the processing unit, and the signal transmission unit transmits a wireless signal to control a light emitted from a lamp according to the light parameter set.

A computer program product provided in an embodiment of the disclosure is adapted to the light controlling device, wherein the light controlling method may be completed after the light controlling device loads and executes at least one program code of the computer program product.

Based on the above, according to the light controlling method, the light controlling device, and the computer program product described in one or more embodiments of the disclosure, the complicated needs of the user are converted into a plurality of parameter fields displayed in the user interface. Thereby, the user may intuitively control the light of the lamp via the plurality of parameter fields, so as to make an ambient light match the needs of the user.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
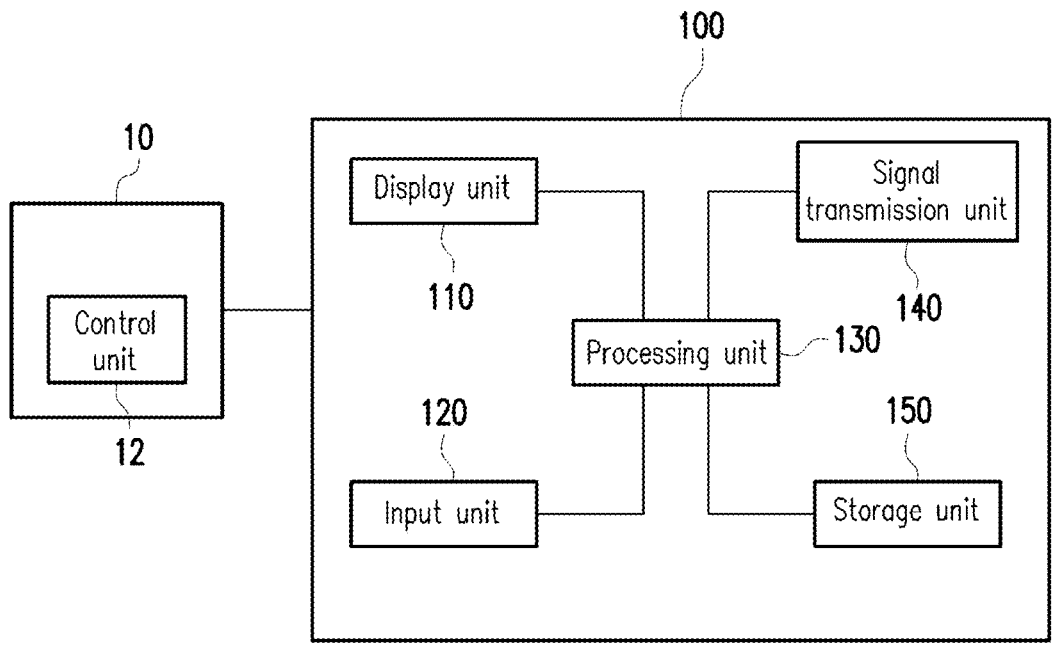
FIG. 1 is a structural diagram of a light controlling device and a light according to an embodiment of the disclosure.

FIG. 1 is a structural diagram of a light controlling device and a light according to an embodiment of the disclosure.

Referring to FIG. 1, a light controlling device 100 provided in an embodiment of the disclosure is connected to a lamp 10 which emits light. The lamp 10 emits different lights according to a control of the light controlling device 100.

In the embodiment, the lamp 10 includes an adjustable light source, for example, a light emitting diode (LED) or an organic light emitting diode (OLED). It should be noted that any device including adjustable lights source can be considered as one type of the lamp 10 of the disclosure.

The lamp 10 has a control unit 12 for receiving a wireless control signal transmitted by the light controlling device 100 and adjusting a color temperature parameter, a luminance parameter, a color rendering parameter, etc. of the LED light source according to the wireless signal. The control unit 12 is implemented in form of a control chip, for example, a chip having a pulse width modulation (PWM) circuit for adjusting light. The type of the lamp 10 and the type of the control unit 12 are not limited by the disclosure, nor does the disclosure limit a connection between the lamp 10 and the light source and a controlling method of the lamp 10.

The light controlling device 100 is configured to receive an operation of a user and transmit the wireless control signal to the lamp 10 which emits light according to the operation of the user. Specifically, the light controlling device 100 includes a display unit 110, an input unit 120, a processing unit 130, a signal transmission unit 140, and a storage unit 150.

The display unit 110 is configured to display various types of information for the user to browse. Particularly, the display unit 110 provided in an embodiment of the disclosure displays a user interface for the user to control the light emitted from the lamp 10 via the user interface. Contents and the operation of the user interface are described as follows. In an embodiment of the disclosure, the display unit 110 may be implemented in form of a liquid crystal panel, but the type of the display unit 110 is not limited by the disclosure.

The input unit 120 is configured to receive a parameter input by the user. The input unit 120 may be implemented in form of a voice input unit (e.g., a microphone) or a touch input unit (e.g., a thin film touch panel). In other embodiments of the disclosure, the input unit 120 may also be a keyboard, a mouse, a microphone, and other devices having an input function and externally connected to the light controlling device 100. The type of the input unit 120 is not limited by the disclosure.

The processing unit 130 is connected to the display unit 110, the input unit 120, the signal transmission unit 140, and the storage unit 150. The processing unit 130 may be a central processing unit (CPU), a programmable general-purpose or special-purpose microprocessor, a digital signal processor (DSP), a programmable controller, an application specific integrated circuit (ASIC), other similar components, or a combination thereof. The disclosure is not limited thereto.

The signal transmission unit 140 is configured to transmit and receive signals. Particularly, the signal transmission unit 140 provided in an embodiment of the disclosure transmits the wireless signal to control the light 10. In an embodiment of the disclosure, the signal transmission unit 140 is implemented in form of a communication chip. The communication chip may be a component that supports a signal transmission of a Global System for Mobile Communication (GSM), a Personal Handy-phone System (PHS), a Code Division Multiple Access (CDMA) system, a Wideband Code Division Multiple Access (WCDMA) system, a Long Term Evolution (LTE) system, a Worldwide interoperability for Microwave Access (WiMAX) system, a Wireless Fidelity (Wi-Fi) system, or a Bluetooth.

The storage unit 150 is configured to store a software, data, and various types of program codes required by the light controlling device 100. The storage unit 150 may be any type of static or dynamic random access memory (SRAM or DRAM), read-only memory (ROM), flash memory, hard disk drive (HDD), solid state drive (SSD), other similar components, or a combination thereof.

A human factor light parameter table is further provided in an embodiment of the disclosure to provide light that further meets needs of the user. The human factor light parameter table records a plurality of different lighting needs scenarios and a corresponding light parameter set. The different lighting needs scenarios include pleasing, relaxing, focus-oriented, warm, comfortable, bright, conventional, not dazzling, not tiring, etc. The light parameter set includes the luminance parameter, the color temperature parameter, the color rendering parameter, a circadian stimulus value parameter, or a partial or a complete combination thereof. For example, the corresponding light parameter set of a warm lighting scenario is as follows: the color temperature parameter and the luminance parameter are 6000 degrees (unit: K) and 991 lux, respectively.

The human factor light parameter table provided in an embodiment of the disclosure not only records the different lighting needs scenarios and the corresponding light parameter sets but also records the corresponding light parameter sets corresponding to combinations of the different lighting needs scenarios. For example, the light parameter set corresponding to a combination of the pleasing, focus-oriented, and comfortable lighting needs scenarios is as follows: the color temperature parameter is 5392 degrees (unit: K) and the luminance parameter is 836 lux.

The number of the light parameter sets recorded in the human factor light parameter table is $\Sigma_1{}^n C(n,m)$, so as to record the corresponding light parameter sets of all possible combinations of the different lighting needs scenarios, wherein n is the number of all the lighting needs scenarios, and m is the number of all possible combinations of the different lighting needs scenarios that may be input by the user. For example, when the light controlling device 100 provides five different lighting needs scenarios, e.g., pleasing, relaxing, focus-oriented, warm, and comfortable, the human factor light parameter table stores 31 combinations of the five different lighting needs scenarios.

In an embodiment of the disclosure, the human factor light parameter table may be stored in the storage unit 150 of the light controlling device 100. However, in other embodiments of the disclosure, the human factor light parameter table may also be stored in a network device. The light controlling device 100 may access the network device via a network connection to obtain the human factor light parameter table. In another embodiment of the disclosure, the light 10 also has a storage unit, and the human factor light parameter table may be stored in the storage unit of the light 10. A storage location of the human factor light parameter table is not limited by the disclosure.

The human factor light parameter table provided in an embodiment of the disclosure is generated through obtaining human factor data via actual human factor experiments, integrating the human factor data, and constructing the corresponding model. A method of generating the human factor light parameter table is described later.

Figure 2:
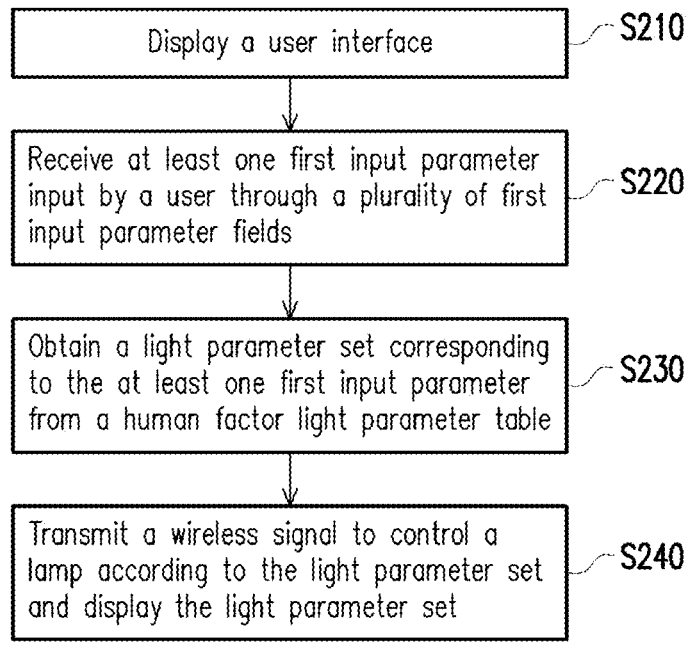
FIG. 2 is a flow chart of a light controlling method according to an embodiment of the disclosure.

FIG. 2 is a flow chart of a light controlling method according to an embodiment of the disclosure. Details of the light controlling method performed by the light controlling device 100 are described below with reference to FIG. 2.

Referring to FIG. 2, in step S210, the display unit 110 displays the user interface. The user interface includes a plurality of first input parameter fields, wherein each of the first input parameter fields respectively corresponds to a different first input parameter. In the embodiment, the first input parameter refers to different lighting needs scenarios, for example, pleasing, relaxing, focus-oriented, warm, comfortable, bright, conventional, not dazzling, not tiring, etc. However, the disclosure is not limited thereto.

In step S220, the input unit 120 receives at least one first input parameter input by the user through the first input parameter fields. In an embodiment of the disclosure, the user may input the at least one first input parameter in the first input parameter fields via the input unit 120. For example, the user may select the at least one of the first input parameter fields via a touch method to input the corresponding first input parameter. In other embodiments of the disclosure, the user may also input the at least one first input parameter in the first input parameter fields via a voice operation method. The input method of the user is not limited by the disclosure.

In the embodiment of the disclosure, the number of the first input parameter which may be selected by the user is not limited to one. The needs of the user are often complicated. For example, a user who is working not only needs to focus but also hopes to be working pleasingly and comfortably. Here, the user may simultaneously select the scenarios of being pleasing, focus-oriented, and comfortable in the first input parameter fields to adjust the light source to a mode that is pleasing, focus-oriented, and comfortable. Here, the input unit 120 receives the at least one first input parameter input by the user as pleasing, focus-oriented, and comfortable.

In step S230, the processing unit 130 obtains the light parameter set corresponding to the at least one first input parameter from the human factor light parameter table. As stated above, the human factor light parameter table records the different lighting needs scenarios and the light parameter sets corresponding to the combinations of the different lighting needs scenarios. That is, the at least one first input parameter input by the user corresponds to one of the combinations of the different lighting needs scenarios recorded in the human factor light parameter table. Therefore, after the user inputs the at least one first input parameter via the user interface, the processing unit 130 obtains from the human factor light parameter table the light parameter set corresponding to the at least one first input parameter input by the user.

In the above exemplary embodiment, the input unit 120 receives the at least one first input parameter of being pleasing, focus-oriented, and comfortable input by the user. Therefore, the processing unit 130 obtains from the human factor light parameter table the light parameter set corresponding to the first input parameters of being pleasing, focus-oriented, and comfortable. Here, for instance, the color temperature parameter of the light parameter set is 5392 degrees (unit: K), and the luminance parameter of the light parameter set is 836 lux.

In step S240, the signal transmission unit 140 transmits a wireless signal to a lamp 10 which emits the light according to the light parameter set, and the display unit 110 displays the light parameter set. As stated above, the signal transmission unit 140 transmits the wireless signal to the control unit 12 to control the light emitted from the lamp 10 according to the corresponding light parameter set of being pleasing, focus-oriented, and comfortable. Besides, the display unit 110 displays the light parameter set. In the above-mentioned exemplary embodiment, the display unit 110 displays the current color temperature parameter and the current luminance parameter as 5392 degrees (unit: K) and 836 lux, respectively, so as to let the user know the value of the current light parameter set.

The complicated lighting needs of the user may be transformed into different first input parameters via the light controlling device 100 and the steps performed by the light controlling device 100. As long as the user intuitively selects one or more first input parameter fields, the light controlling device 100 automatically adjusts the light emitted by the lamp 10 to match the needs of the user.

However, since people have different perceptions of light, in an embodiment of the disclosure, the user may further adjust light parameters based on the light parameter set displayed by the display unit 110 to find the light that better complies with the needs of the user.

Figure 3:
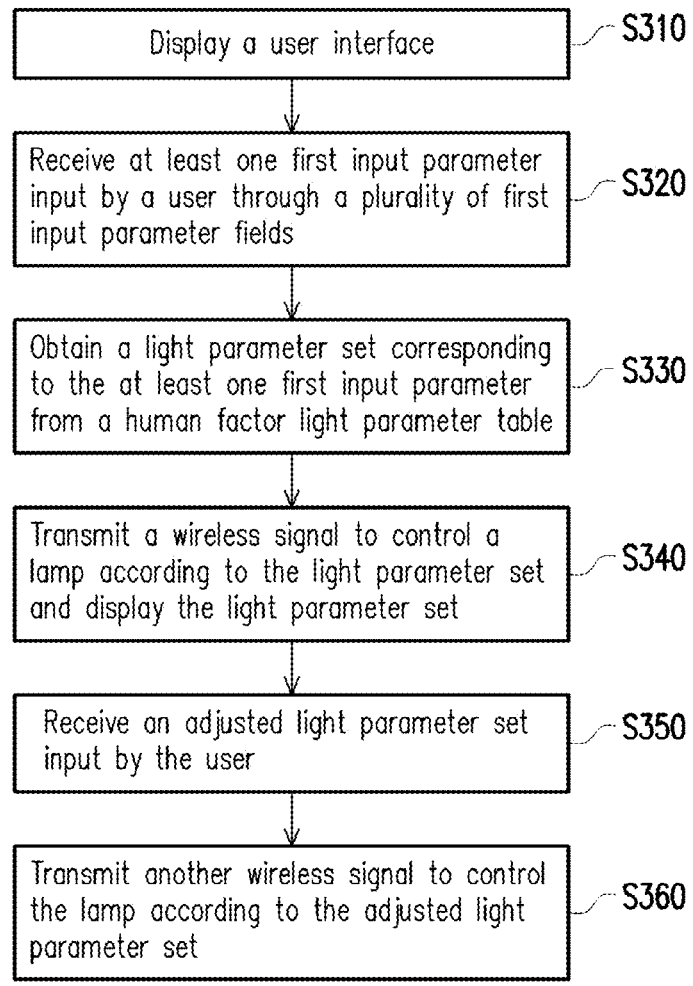
FIG. 3 is a flow chart of a light controlling method according to another embodiment of the disclosure.

Referring to FIG. 3, FIG. 3 is a flow chart of a light controlling method according to another embodiment of the disclosure. Steps S310-S340 shown in FIG. 3 are identical to the steps S210-S240 shown in FIG. 2, and thus no further explanation will be provided hereinafter. However, in the embodiment, the user may further adjust the light parameter set via performing steps S350-S360.

In step 350, the input unit 120 receives an adjusted light parameter set input by the user. Specifically, the user may adjust the light parameter set corresponding to the at least one first input parameter to generate the adjusted light parameter set. For example, when the user feels that the light adjusted according to the light parameter set has an overly high color temperature and an insufficient luminance, the user may, based on the light parameter set, lower the color temperature and increase the luminance. In the adjusted light parameter set received by the input unit 120, the adjusted color temperature parameter is 5000 degrees (unit: K), for instance, and the adjusted luminance parameter is 1000 lux, for instance.

In step S360, the signal transmission unit 140 transmits another wireless signal to control the light emitted from the lamp 10 according to the adjusted light parameter set. Here, the lamp 10 emits a light having the color temperature parameter of 5000 degrees (unit: K) and the luminance parameter of 1000 lux according to the wireless signal.

In an embodiment of the disclosure, the user interface not only provides the first input parameter fields but also provides a plurality of second input parameter fields. The second input parameter fields may correspond to the color temperature parameter of light, the luminance parameter of light, the color rendering parameter of light, the circadian stimulus value parameter of light, and the combination thereof. That is, the user may directly adjust the light emitted from the lamp 10 according to relevant parameters of the light via the second input parameter fields provided by the user interface.

Figure 4:
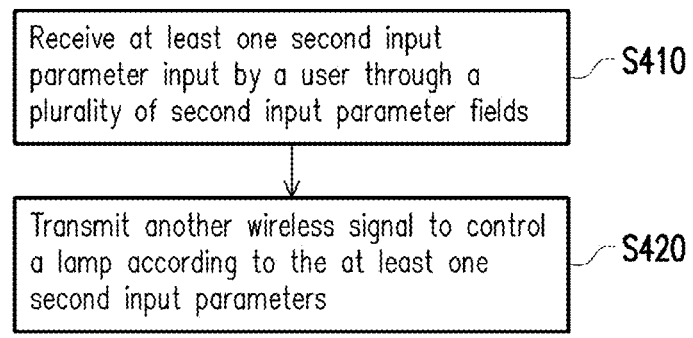
FIG. 4 is a flow chart of a light controlling method according to another embodiment of the disclosure.

FIG. 4 is a flow chart of a light controlling method according to another embodiment of the disclosure.

With reference to FIG. 1 and FIG. 4, in step S410, the input unit 120 receives at least one second input parameter input by the user through a plurality of second input parameter fields. For example, the color temperature parameter and the luminance parameter directly input by the user in the second input parameter fields are 5000 degrees (unit: K) and 1000 lux, respectively.

In step 420, the signal transmission unit 140 transmits another wireless signal to control the light emitted from the lamp 10 according to the second input parameters. Here, the lamp 10 emits the light having the color temperature parameter of 5000 degrees (unit: K) and the luminance parameter of 1000 lux.

In another embodiment of the disclosure, the light parameter set of the human factor light parameter table may be obtained via calculations done by an external calculating device, and the calculation results are stored in the storage unit 150 of the light controlling device 100. Alternatively, the calculations may be done within the light controlling device 100.

A method of generating the human factor light parameter table within the light controlling device 100 is described as follows. In the disclosure, when the human factor light parameter table is generated, the human factor experiments may be designed and performed to respectively obtain control factors (e.g., color temperature, luminance, and other factors) of different lights and corresponding response values of the user to the light source while the control factors are at different intensities/levels. Next, a response surface methodology (RSM) is applied in the disclosure to construct a model of an optimized hybrid human factor model.

Specifically, the RSM is applied in a finding optimal control factor plot algorithm in the disclosure. The finding optimal control factor plot algorithm follows a sequential procedure logic of the RSM to quickly find optimal control factor plots along an improved path. After obtaining the experimental data, the processing unit 130 first fits a first order linear regression model according to independent variables (i.e., the control factors) and response variables (i.e., the response values of the user) of the experimental data, and then the processing unit 130 determines whether or not the first order linear regression model is close to an optimization plot via an analysis of variance (ANOVA).

Next, the processing unit 130 finds an experimental range of the optimization plot of the response surface via a method of steepest descent or ascent. Specifically, while the method of steepest descent or ascent is applied, a moving procedure increases or decreases together with the maximum response value until the response value cannot be further improved.

Next, the processing unit 130 provided in the disclosure fits a second order curvature and obtains an optimal control parameter via ANOVA and a process of controlling the optimization plot of the control factors. The processing unit 130 may find a response surface optimization plot with more accuracy by using the finding optimal control factor plot algorithm with RSM; thereby, calculation issues including the lack of data, incorrect location of the plot, and the location of the plot being outside the standard range may be resolved.

When constructing model of the optimal hybrid human factor model, there are three stages in the method of generating the human factor control table through the finding optimal control factor plot algorithm with RSM. The first stage is an individual optimization; at the second stage, individual desirability function values are generated, and the third stage is simultaneous optimization. At the first stage and the third stage, the RSM is applied in the finding optimal control factor plot algorithm. However, the first stage is primarily for individual optimization, while the third stage is primarily for simultaneous optimization. Therefore, the processing unit 130 assigns a weight (i.e., the desirability function) to each objective in the third stage. Thereby, the processing unit 130 may find the optimal control parameter by using the finding optimal control factor plot algorithm with RSM according to the weight of each objective and the result of the individual optimization. Detailed descriptions are as follows.

The input unit 120 receives the experimental data, wherein each of the experimental data is the response value generated by the user in response to different control factors via the human factor experiments. Therefore, each of the experimental data includes the control factor and the response value.

The individual optimization in the first stage is mainly to construct a model of one response value corresponding to the control factor. Specifically, the processing unit 130 calculates the fitted second order response surface function and response surface plot with one response value (Y) corresponding to the control factor (X) and obtains a stationary point as the optimal point of the control factor, thereby obtaining the optical control parameter corresponding to an individual objective. The processing unit 130 inputs a value of the control factor corresponding to the stationary point into the second order response surface function to obtain an optimal forecasted response value ($Y_{op}$).

Figure 5A:
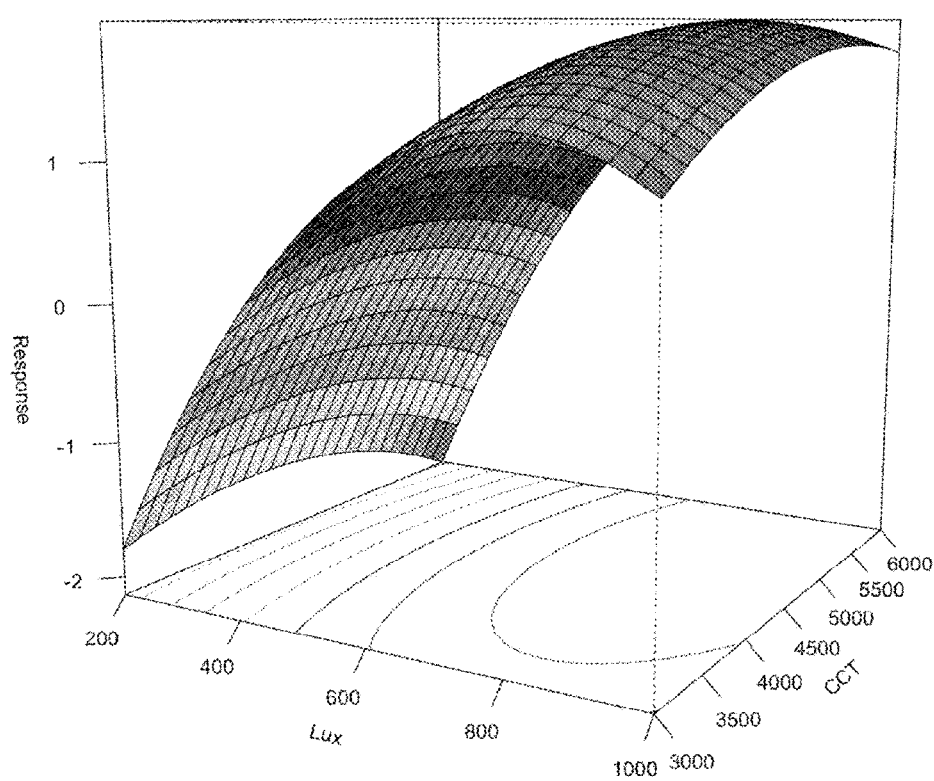
FIG. 5A is a response surface plot of an individual optimization.
Figure 5B:
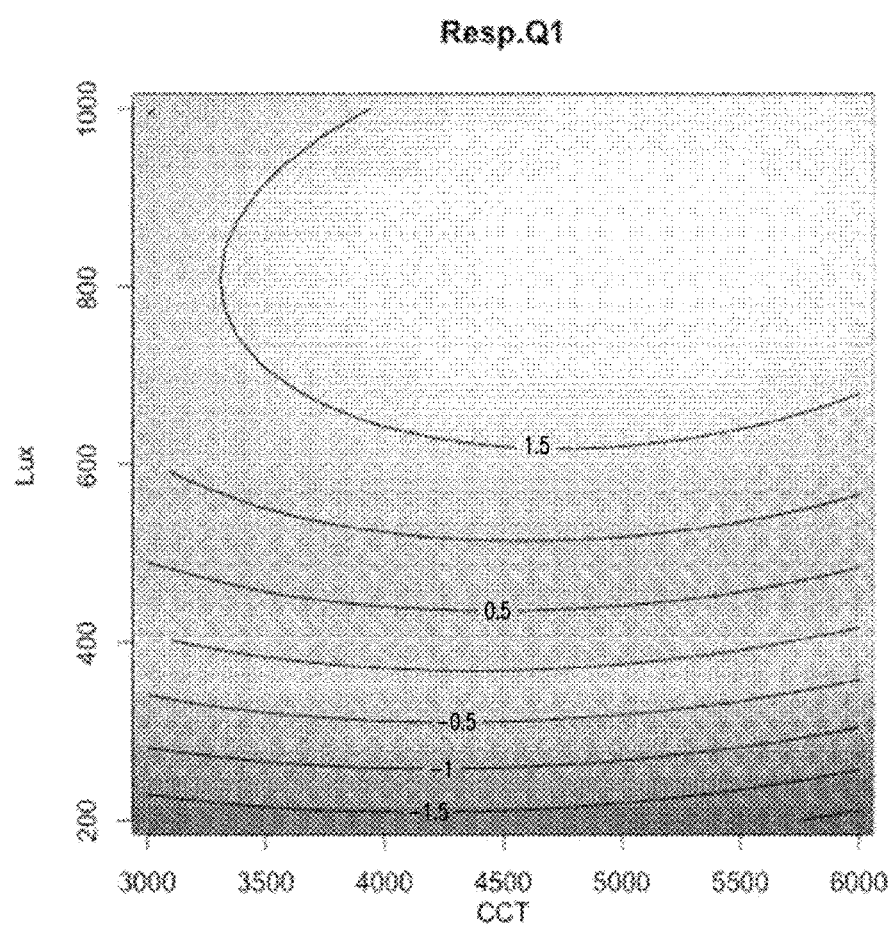
FIG. 5B is a contour plot of an individual optimization.

In the embodiment, the color temperature (CCT) and the luminance (LUX) are the control factors. Referring to FIG. 5A and FIG. 5B, FIG. 5A is a response surface plot of the individual optimization, and FIG. 5B is a contour plot of the individual optimization. FIG. 5A is a three-dimensional representation of the response surface to show a location of the stationary point. FIG. 5B is a two-dimensional representation of the response surface shown in FIG. 5A to show the location of the stationary point. In FIG. 5B, the control factors (i.e., CCT and LUX) are axis points, and the response value ($Y_i$) is a surface gradient. As shown in FIG. 5B, the response value above 1.5 is the location of the stationary point where an optimal preset response value may be obtained.

In the second stage of generating individual desirability function values, the processing unit 130 mainly adopts the simultaneous optimization to simultaneously consider issues of optimizing a plurality of response values, thereby constructing the hybrid human factor model. The processing unit 130 converts each response value ($Y_j$) into a desirability function ($d_i$) according to the response values ($Y_1, Y_2 \ldots, Y_j$) of the experimental data and the type of the desired objective function (bigger the better, smaller the better, or nominal the best) corresponding to the response value.

For example, while the experiments are being designed in consideration of the lighting needs scenarios of being pleasing, focus-oriented, and comfortable, the user respectively provides the response values to the three following questions at different levels of the control factors: a question Q1 is depressing (negative) or pleasing (positive), question Q2 is not focus-oriented (negative) or focus-oriented (positive), and question Q3 is uncomfortable (negative) or comfortable (positive). The processing unit 130 determines whether the nature of the desired objective function (i.e., a desired response value of being pleasing, focus-oriented, and comfortable) is bigger the better, smaller the better, or nominal the best. Since the properties of being pleasing, focus-oriented, and comfortable belong to the bigger-the-better type, the processing unit 130 may use a bigger-the-better formula to convert the response values of the user having the lighting needs of being pleasing, focus-oriented, and comfortable into individual desirability functions ($d_i$).

In the simultaneous optimization at the third stage, the processing unit 130 further generates a total desirability function ($D_i$) of a plurality of reactions according to the individual desirability functions ($d_i$) and each level of the control factors. A method of generating the total desirability function ($D_i$) according to the individual desirability functions ($d_i$) is, for example:

$$D=(d_1 \times d_2 \times \ldots d_m)^{1/m}$$

After calculating the total desirability function ($D_i$), the processing unit 130 may input the total desirability function ($D_i$) and the optimal preset response value into the finding optimal control factor plot algorithm with RSM, thereby calculating the response values corresponding to the control factors and finding an optimal control parameter set corresponding to the simultaneous optimization.

Figure 6A:
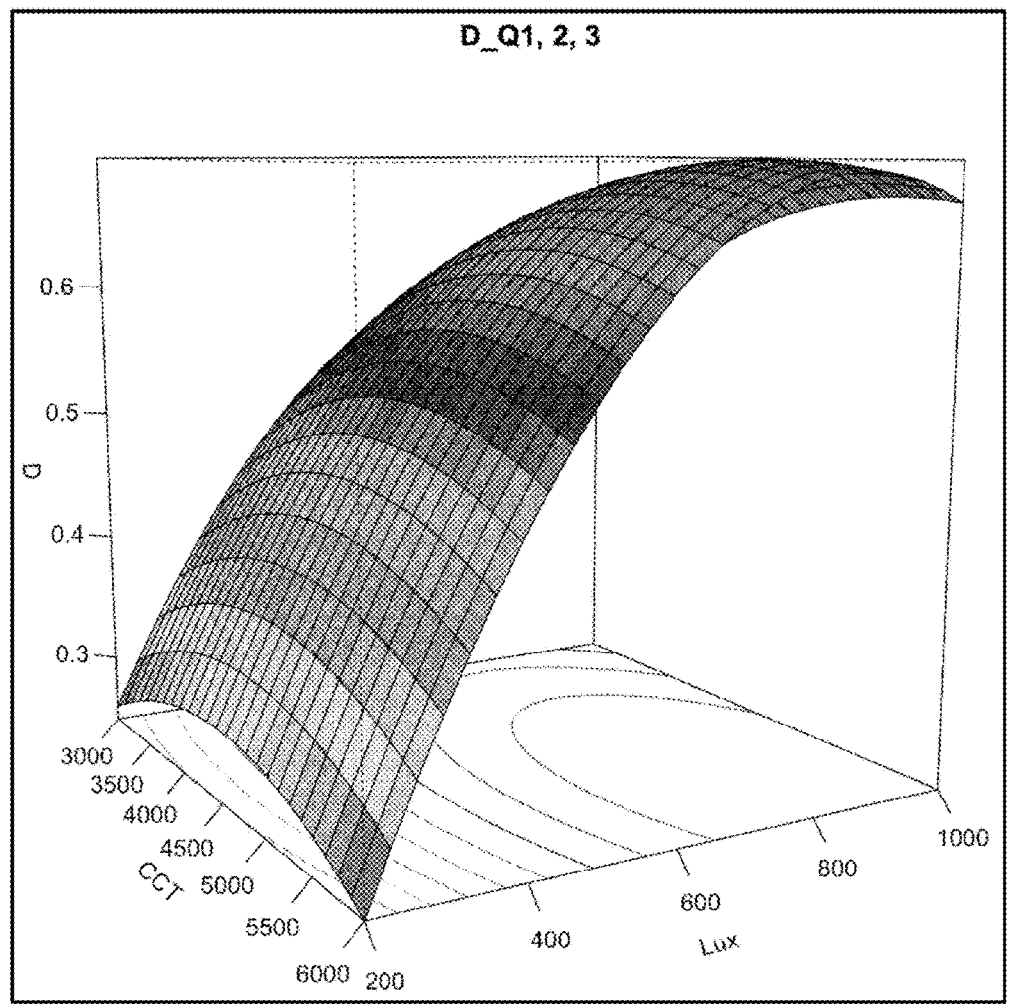
FIG. 6A is a surface plot of a plurality of individual desirability functions of a simultaneous optimization.
Figure 6B:
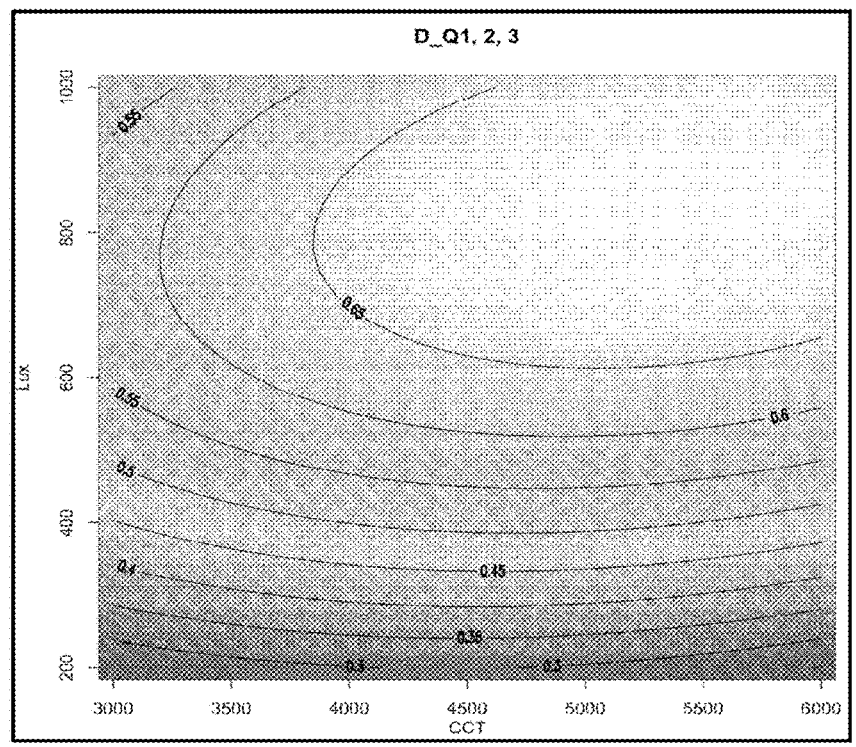
FIG. 6B is a contour plot of a simultaneous optimization.
Figure 6C:
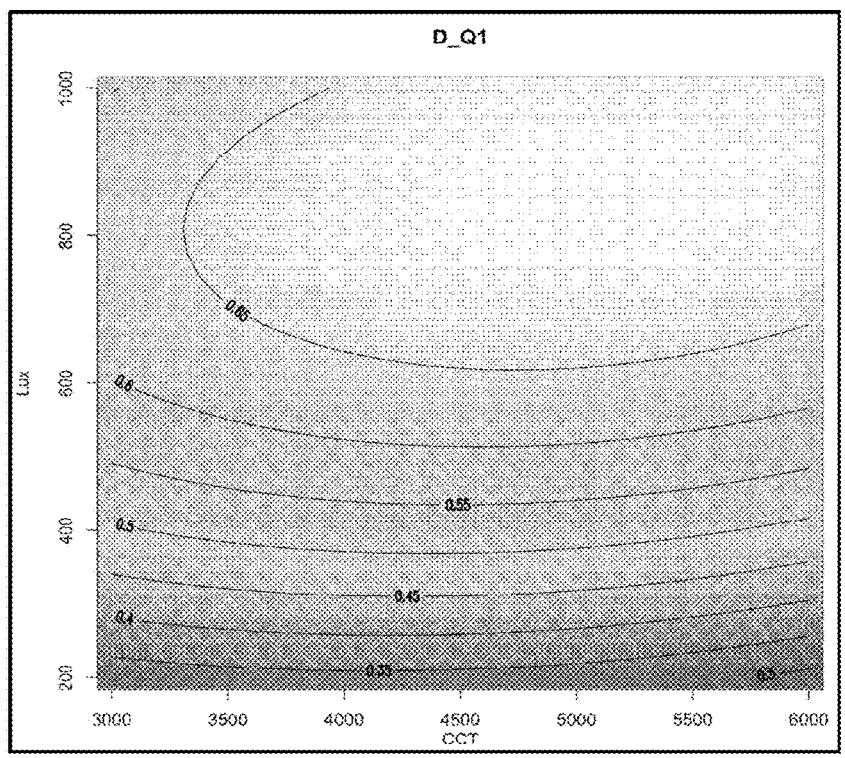
FIG. 6C to 6E are contour plots of individual optimizations.
Figure 6D:
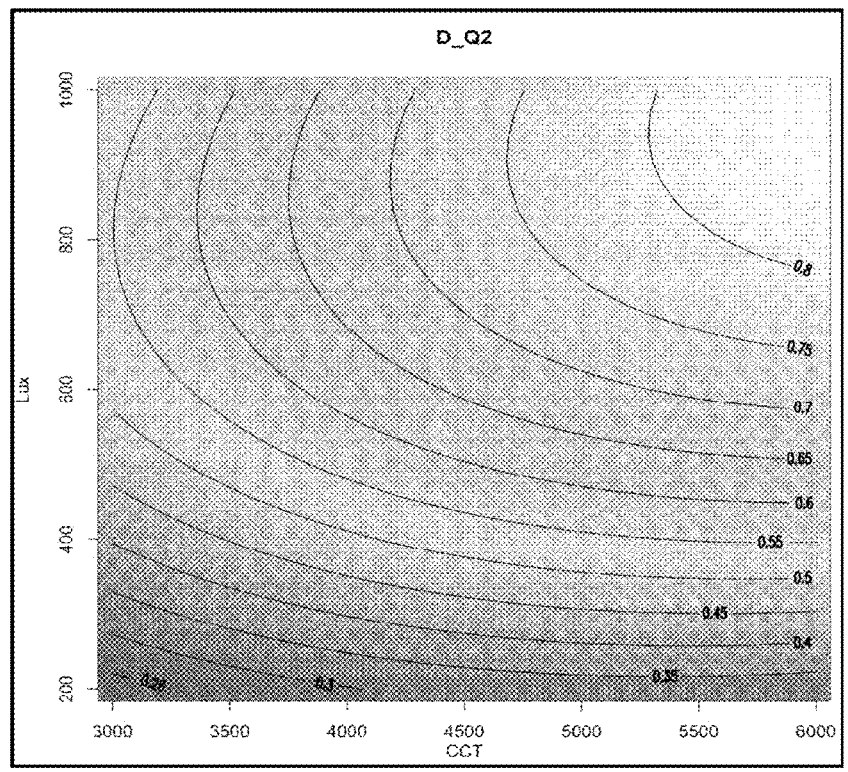
Figure 6E:
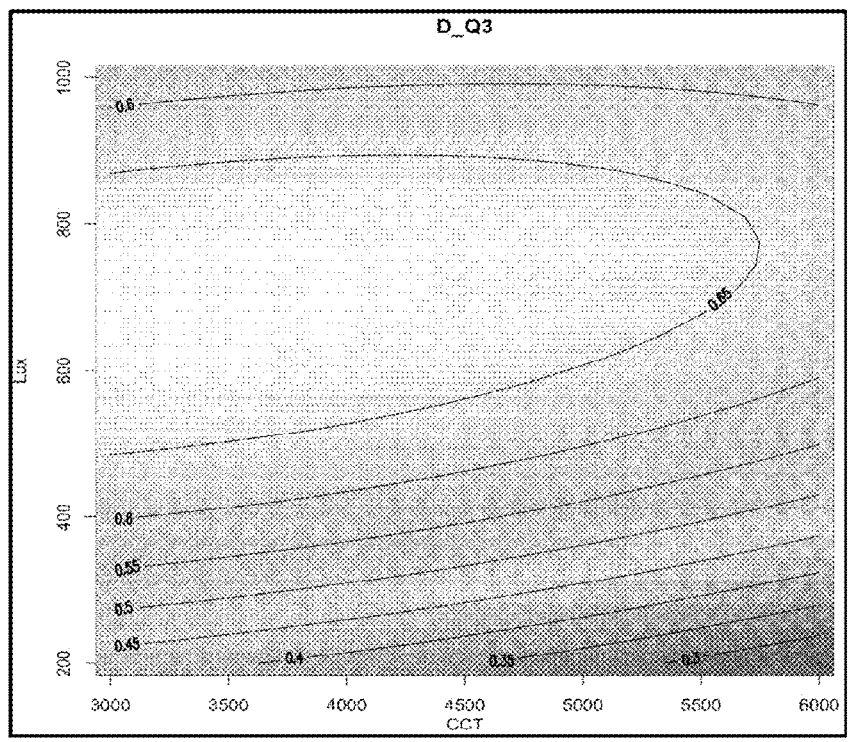

Referring to FIG. 6A to FIG. 6E, FIG. 6A is a response surface plot of the total desirability function ($D_i$) of the simultaneous optimization, FIG. 6B is a contour plot of the simultaneous optimization, and FIG. 6C to FIG. 6E are contour plots of individual optimizations. A simultaneous surface shown in FIG. 6A is mainly adapted to rendering a curvature of the total desirability function ($D_t$) in terms of the three scenarios of being pleasing, focus-oriented, and comfortable and finding the control factor of the optimal desirability value that satisfies the three scenarios according to the curvature. FIG. 6B is the contour plot corresponding to the response surface plot shown in FIG. 6A, i.e., FIG. 6B is the contour plot of the simultaneous optimization generated according to the questions Q1-Q3. FIG. 6C to FIG. 6E are the contour plots of the individual optimizations of the questions Q1-Q3, respectively. The simultaneous optimization is to find a common control factor that satisfies all objectives according to individual desirability curvatures of each objective, so a center of the contour plot shown in FIG. 5B is an intersection point of the individual questions shown in FIG. 6C to FIG. 6E, thereby obtaining an optimal control factor corresponding to the questions Q1-Q3.

After obtaining the common control factor that satisfies all objectives according to the individual desirability curvatures, the processing unit 130 creates the human factor light parameter table according to the optimal control parameter set corresponding to the individual optimization and the optimal control parameter set corresponding to the simultaneous optimization.

An embodiment of the disclosure provides a computer program product. The computer program product includes at least one program code for executing the light controlling method. After an electronic device loads and executes the at least one program code, the light controlling method can be completely performed, and the functions of the light controlling device 100 can be achieved Since the steps S210-S260 have been disclosed above, repetitive descriptions are omitted hereinafter.

To sum up, according to the light controlling method, the light controlling device, and the computer program product provided in one or more embodiments of the disclosure, the complicated needs of the user are converted into intuitive parameters, and the parameters are displayed on the user interface. The user may adjust the light of the lamp 10 by clicking on the parameter fields on the user interface, so as to make the ambient light match the needs of the user. Additionally, in response to preferences of difference users, the light controlling device further calculates the color temperature parameter, the luminance parameter, and other light parameters while at least one combination of scenarios are given according to the human factor experiment, thereby providing the parameters that better matches the needs of the user. The user may select the combination of scenarios and fine-tune the light emitted by the lamp 10 according to his or her preferences. As such, the light controlling method, the light controlling device, and the computer program product provided herein allows the user to make adjustment in a simple manner, and the appropriate light source may be provided to the user.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A light controlling method, comprising:
   displaying a user interface comprising a plurality of first input parameter fields in the user interface;
   receiving input of at least one first input parameter through the plurality of first input parameter fields;
   obtaining a light parameter set corresponding to the at least one first input parameter from a human factor light parameter table; and
   transmitting a wireless signal to control a light emitted from a lamp according to the light parameter set.

2. The light controlling method of claim 1, further comprising:
   displaying the light parameter set in the user interface after obtaining the light parameter set corresponding to the at least one first input parameter from the human factor light parameter table.

3. The light controlling method of claim 2, further comprising:
   receiving an adjusted light parameter set, wherein the adjusted light parameter set is generated according to an adjustment of the light parameter set; and
   transmitting another wireless signal to control the light emitted from the lamp according to the adjusted light parameter set.

4. The light controlling method of claim 3, wherein the at least one first input parameter comprises a plurality of lighting needs scenarios, and the light parameter set comprises a color temperature parameter, a luminance parameter, a color rendering parameter, a circadian stimulus value parameter, or a combination thereof.

5. The light controlling method of claim 1, further comprising: storing the human factor light parameter table in a light controlling device, a network device, or the lamp emitting the light.

6. The light controlling method of claim 1, further comprising:
   receiving a plurality of experimental data respectively comprising a control factor and a response value;
   calculating the plurality of experimental data to obtain a plurality of optimal control parameter sets corresponding to an individual optimization and a plurality of optimal preset response values;
   calculating the response values of the plurality of experimental data to obtain a plurality of individual desirability functions corresponding to the plurality of experimental data;
   obtaining a total desirability function according to the plurality of individual desirability functions;
   calculating the total desirability function and the plurality of optimal preset response values to obtain a plurality of optimal control parameter sets corresponding to a simultaneous optimization; and
   creating the human factor light parameter table according to the plurality of optimal control parameter sets corresponding to the individual optimization and the plurality of optimal control parameter sets corresponding to the simultaneous optimization.

7. The light controlling method of claim 1, wherein a number of the light parameter set stored by the human factor light parameter table is $\Sigma_1^n C(n,m)$, wherein n is a number of the plurality of first input parameter fields, m is a number of the at least one first input parameter.

8. The light controlling method of claim 1, further comprising:
   configuring a plurality of second input parameter fields corresponding to a plurality of second input parameters in the user interface;
   receiving at least one of the plurality of second input parameters through the plurality of second input parameter fields;

transmitting another wireless signal to control the light emitted from the lamp according to the at least one of the plurality of second input parameters.

9. A light controlling device, comprising:
a display unit, displaying a user interface, wherein the user interface comprises a plurality of first input parameter fields;
an input unit, receiving at least one first input parameter through the plurality of first input parameter fields;
a processing unit, coupled to the display unit and the input unit, wherein the processing unit obtains a light parameter set corresponding to the at least one first input parameter from a human factor light parameter table; and
a signal transmission unit, coupled to the processing unit, wherein the signal transmission unit transmits a wireless signal to control a light emitted from a lamp according to the light parameter set.

10. The light controlling device of claim 9, wherein the display unit displays the light parameter set in the user interface after the processing unit obtains the light parameter set corresponding to the at least one first input parameter from the human factor light parameter table.

11. The light controlling device of claim 10, wherein the input unit receives an adjusted light parameter set, and the adjusted light parameter set is generated according to an adjustment of the light parameter set,
wherein the signal transmission unit transmits another wireless signal to control the light emitted from the lamp according to the adjusted light parameter set.

12. The light controlling device of claim 11, wherein the plurality of first input parameters comprises a plurality of lighting needs scenarios, and the light parameter set respectively comprises a color temperature parameter, a luminance parameter, a color rendering parameter, a circadian stimulus value parameter, or a combination thereof.

13. The light controlling device of claim 9, further comprising a storage unit coupled to the processing unit and storing the human factor light parameter table.

14. The light controlling device of claim 9,
wherein the input unit receives a plurality of experimental data respectively comprising a control factor and a response value,
the processing unit calculates the plurality of experimental data to obtain a plurality of optimal control parameter sets corresponding to an individual optimization and a plurality of optimal preset response values,
the processing unit calculates the response values of the plurality of experimental data to obtain a plurality of individual desirability functions corresponding to the plurality of experimental data,
the processing unit obtains a total desirability function according to the plurality of individual desirability function,
the processing unit calculates the total desirability function and the plurality of optimal preset response values to obtain a plurality of optimal control parameter sets corresponding to a simultaneous optimization,
the processing unit creates the human factor light parameter table according to the plurality of optimal control parameter sets corresponding to the individual optimization and the plurality of optimal control parameter sets corresponding to the simultaneous optimization.

15. The light controlling device of claim 9, wherein a number of the light parameter set stored by the human factor light parameter table is $\Sigma_1^n C(n,m)$, wherein n is a number of the plurality of first input parameter fields, and m is a number of the at least one first input parameter.

16. The light controlling device of claim 9, wherein the user interface comprises a plurality of second input parameter fields corresponding to a plurality of second input parameters, the input unit receives at least one of the plurality of second input parameters through the plurality of second input parameter fields, and the signal transmission unit transmits another wireless signal to control the light emitted from the lamp according to the at least one of the plurality of second input parameters.

17. The light controlling device of claim 9, wherein the input unit is a touch input unit or a voice input unit.

18. A computer program product having at least one program code, wherein the method of claim 1 may be completed after an electronic device loads and executes the at least one program code.

* * * * *